(12) United States Patent
Bohn

(10) Patent No.: US 6,774,945 B1
(45) Date of Patent: Aug. 10, 2004

(54) FOCUSING APPARATUS FOR IMAGE RECORDING SYSTEM

(75) Inventor: David D. Bohn, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/420,084

(22) Filed: Oct. 18, 1999

(51) Int. Cl.$^7$ .................... H04N 5/232; H04N 5/222
(52) U.S. Cl. .................... 348/345; 348/370
(58) Field of Search ................ 348/345, 370, 348/371, 81; 396/28, 106, 107, 109, 175; 356/3.1

(56) References Cited

U.S. PATENT DOCUMENTS

| | | | |
|---|---|---|---|
| 3,738,248 A | * 6/1973 | Fish et al. | 396/28 |
| 4,032,934 A | 6/1977 | Hendrickson et al. | |
| 4,477,185 A | 10/1984 | Berger et al. | |
| 4,777,501 A | 10/1988 | Caimi et al. | |
| 4,836,671 A | * 6/1989 | Bautista | 396/107 |
| 4,914,460 A | 4/1990 | Caimi et al. | |
| 5,142,299 A | 8/1992 | Braun | |
| 5,289,220 A | * 2/1994 | Fidler et al. | 396/107 |
| 5,416,544 A | 5/1995 | Stapleton | |
| 5,459,532 A | * 10/1995 | Baba | 348/345 |
| 5,550,641 A | * 8/1996 | Shashua et al. | 348/370 |

FOREIGN PATENT DOCUMENTS

| | | |
|---|---|---|
| DE | 942848 C | 5/1956 |
| JP | 622290163 A | 10/1987 |
| JP | 11288063 A | 10/1999 |

OTHER PUBLICATIONS

English abstract of Japanese Patent JP11288063A published Oct. 19, 1999.

English abstract of Japanese Patent JP62229013A published Oct. 7, 1987.

EPO Search Report dated Feb. 2, 2003, in corresponding EPO applications S/N 00112169.8–1234.

* cited by examiner

Primary Examiner—Wendy R. Garber
Assistant Examiner—Luong Nguyen

(57) ABSTRACT

An image recording system typically having a fixed lens system for easily recording a focused image of an object. The image recording system includes light beam sources directed such that when the projections of their light beams onto the object overlay each other, the object is positioned at the correct distance from the image recording system to project a focused image onto the image recording medium. Additional pairs of light beam sources are added to the image recording system to provide for rotational alignment of the image recording system with the object. The system can be fabricated as an inexpensive document recording system.

18 Claims, 4 Drawing Sheets

FOCUSING APPARATUS FOR IMAGE RECORDING SYSTEM

FIELD OF THE INVENTION

The present invention relates generally to image recording devices, more particularly to cameras and video cameras, and even more particularly to the focus of such devices.

BACKGROUND OF THE INVENTION

In order to record clear images of objects at varying distances from an image recording device such as a photographic film still camera, a photographic film motion picture camera, an analog video camera, a digital still camera, a digital video camera, or the like the image projected onto the film or image sensor used for image capture must be in focus. A typical method of obtaining such focus is to vary the distance between the lens and the plane of the film or image sensor either manually or automatically in relation to the distance from the object to the lens.

However, less expensive cameras can be produced using a fixed lens system. In such cameras, the distance from the lens to the plane of exposure is fixed. Now, however, obtaining a clear image becomes more difficult, as the camera must be moved to a fixed distance from the object at which the image of the object is in focus. The in-focus object-to-lens distance is defined by the focal length of the lens system and the lens-to-plane-of-exposure distance, wherein the lens-to-plane-of-exposure distance is the distance between the lens of the image recording device and the plane of the film or image sensor used to record the image of the object. Among other means, the in-focus object-to-lens distance can be obtained and subsequently adjusted by either (1) guessing the distance, (2) using an optical rangefinder, (3) forming two images on an image sensor from two lenses located a short distance apart, using a mirror to move one of the images until the two sets of signals produced by the two images on the sensor have maximum correlation, and then correlating the object-to-lens distance with the position of the mirror, (4) measuring the time taken for an ultrasonic wave pulse to reach the object and be reflected back to a detector on the camera, (5) measuring the amount of light or infra-red radiation reflected back from a scene by an emitted flash and correlating that measurement to the object-to-lens distance based on the average reflectance observed with scenes of average reflectance, and (6) viewing the image prior to exposure as in a single-lens reflex camera. All these methods are useful, but all have their disadvantages. Guessing is at best error prone, while the other techniques are expensive and time consuming as they may require additional equipment and several iterations of measurements with subsequent adjustment of the object-to-lens distance before making an exposure. In addition, false readings may occur in some situations depending upon the technique used. As an example, a heavily illuminated scene could indicate a false object-to-lens distance if that distance is set using the measurement of object reflected light from an emitted flash. Lens systems having a large range of object-to-lens distances in which the image of the object is in focus have also been used but are useful only when object-to-lens distances are large.

Thus, there is a need for an image exposure system that can easily, accurately, inexpensively, and automatically capture focused images using fixed lens systems.

SUMMARY OF THE INVENTION

In preferred embodiments, the present patent document describes method and apparatus for obtaining a focused image using an image recording device having a fixed lens-to-plane-of-exposure distance, wherein the lens-to-plane-of-exposure distance is the distance between the lens of the image recording device and the plane of the image recording medium which could be for example photographic film or an image sensor. The image recording system includes light beam sources directed such that when the projections of their light beams onto an object overlay or intersect each other, the object is positioned at the correct distance from the image recording system to project a focused image onto the image recording medium.

While applicable for use with various lens-to-plane-of-exposure distances, the lens-to-plane-of-exposure distance can be fixed in representative embodiments providing the ability to manufacture relatively inexpensive cameras used for document recording.

In alternative embodiments, additional pairs of light beam sources are added to the image recording system to provide for rotational alignment of the image recording system with the object.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

Figure 1:
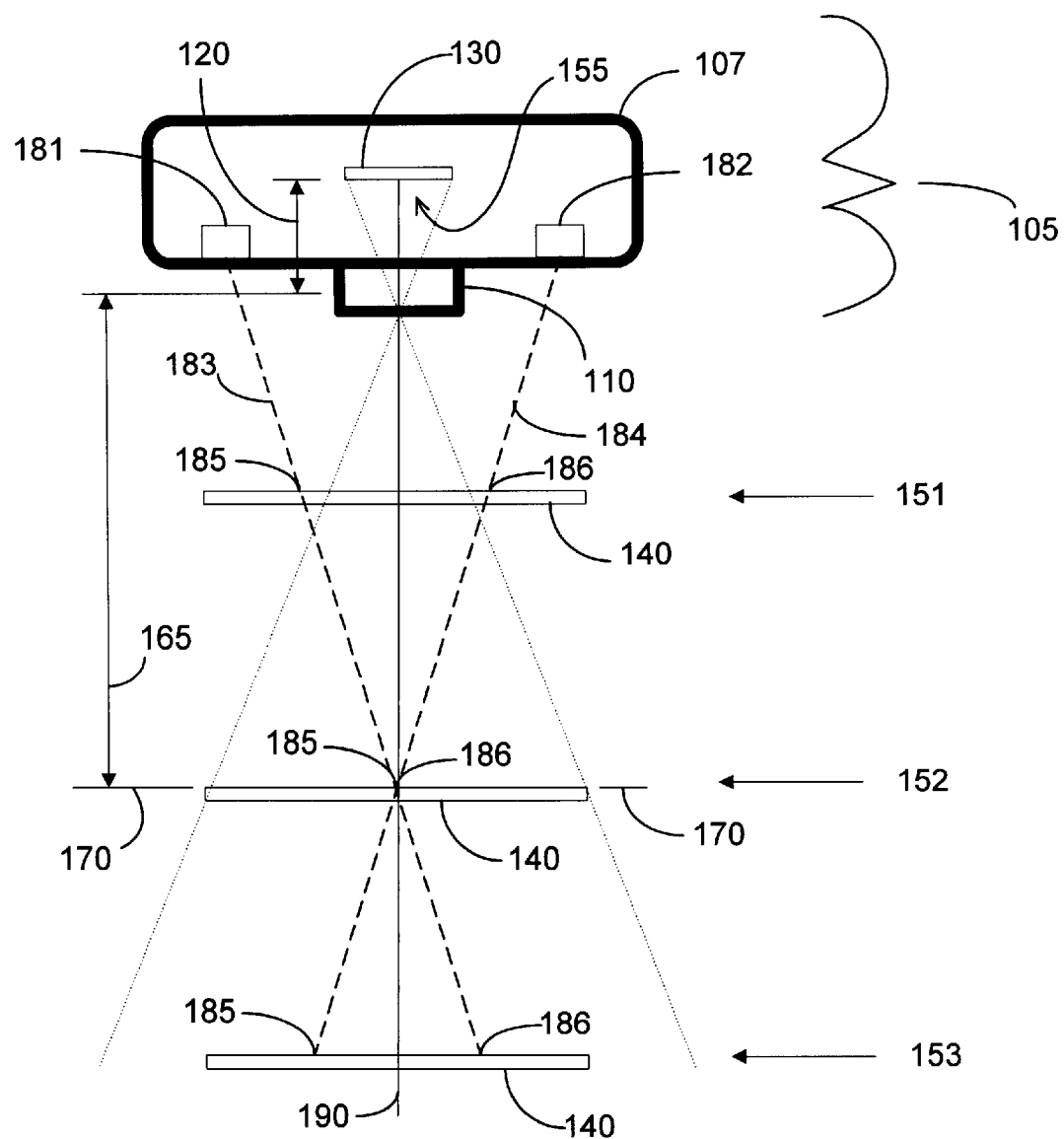
FIG. 1 is a drawing of an image recording system in accordance with a representative embodiment of the invention.

As shown in the drawings for purposes of illustration, the present patent document describes methods and apparatus for obtaining a focused image using an image recording system. The image recording system includes light beam sources directed such that when the projections of their light beams onto an object overlay or intersect each other, the object is positioned at the correct distance from the image recording system to project a focused image onto the image recording medium. While applicable for use with various lens-to-plane-of-exposure distances, the lens-to-plane-of-exposure distance can be fixed in representative embodiments providing the ability to manufacture relatively inexpensive cameras used for document recording. In the following detailed description and in the several figures of the drawings, like elements are identified with like reference numerals.

2. Discussion

FIG. 1 is a drawing of an image recording system 105 in accordance with a representative embodiment of the invention. In a preferred embodiment, the image recording system 105 comprises a lens 110 and an image recording medium 130, wherein the image recording medium 130 could be, for example, photographic film 130 or an image sensor 130 and wherein the lens 110 is placed at a lens-to-plane-of-exposure distance 120, also referred to herein as a first distance 120, from the image recording medium 130. Image recording systems 105 could be, for example, photographic film still cameras 105, photographic film motion picture cameras 105, analog video cameras 105, digital still cameras 105, digital video cameras 105, or the like.

In FIG. 1, an object 140, which could be for example a sheet of paper 140 or other document 140, is shown at a first, a second, and a third positions 151,152,153 relative to the image recording system 105. The distance between the object 140 and the lens 110 in the first position 151 is less than the distance between the object 140 and the lens 110 in the second position 152, and the distance between the object 140 and the lens 110 in the second position 152 is less than the distance between the object 140 and the lens 110 in the third position 153. These positions 151,152,153 relative to the lens 110 of the image recording system 105 could be obtained by the relative positioning of either the object 140 or the image recording system 105. Also shown in FIG. 1 is a case 107 within or to which the various components of the image recording system 105 are contained or mounted.

An image 155 of the object 140 is only projected substantially in focus onto the image recording medium 130 when it is placed in a focal plane 170 of the lens 110 which is shown in FIG. 1 as the second position 152. When in the second position 152, the object 140 is located a second distance 165 from the lens 110. At other distances between the object 140 and the lens 110, the image 155 of the object 140 projected onto the image recording medium 130 will be out of focus.

The image recording system 105 further comprises a first light beam apparatus 181 and a second light beam apparatus 182, wherein the first light beam apparatus 181 and the second light beam apparatus 182 emit first and second light beams 183,184 respectively. When the image recording system 105 is directed toward the object 140, first and second light beam images 185,186 are projected onto the object 140. First and second light beams 183,184 are essentially co-planar and are directed such that when the object 140 to be photographed lies in the fixed focal plane 170 of the image recording system 105 the images of the first and second light beams 183,184 overlay each other on the object 140. When this condition occurs, the object 140 is positioned at the second distance 165 from the lens 110, and the image 155 of the object 140 projected onto the image recording medium 130 is substantially in focus. Thus, as an example, a focused image is obtained by first moving the image recording system 105 with respect to the object 140 until the light beam images 185,186 overlay each other and then capturing the image 155 by for example opening the shutter of the lens 110. For clarity of illustration, the shutter in not shown in FIG. 1. Typically the first light beam apparatus 181 and the second light beam apparatus 182 are turned off just prior to image 155 capture, so that the image of the light beams 183,184 produced by the first light beam apparatus 181 and the second light beam apparatus 182 do not appear in the resultant photograph. Control of illumination from first and second light beam apparatuses 181,182 could be, for example, by means of a four position switch. The four position switch is not shown in the drawings. In a first position, the light beam apparatuses 181,182 are turned off. In a second position, the light beam apparatuses 181,182 are turned on. Once the position of the image recording system 105 is adjusted with respect to the object 140 such that light beam images 185,186 overlay each other, the four position switch is placed in its third position which turns off illumination from the light beam apparatuses 181,182. And finally in the fourth position, a shutter on the lens 110 is opened and the image recording medium 130 is exposed to the image 155.

In the representative embodiment, first and second light beams 183,184 and optical axis 190 of the lens 110 of the image recording system 105 are co-planar, and first and second light beams 183,184 overlap at a point on the optical axis 190 when the object 140 is in focus. However, other embodiments are also possible. In particular, the light beams 183,184 could be directed so as to intersect at a point removed from the optical axis 190 of the image recording system 105.

It will be understood that the term lens as used herein includes systems of lenses. Also, by optical axis 190 is meant a line drawn perpendicular to the plane of the lens 110 and through the optical center of the lens 110.

Figure 2A:
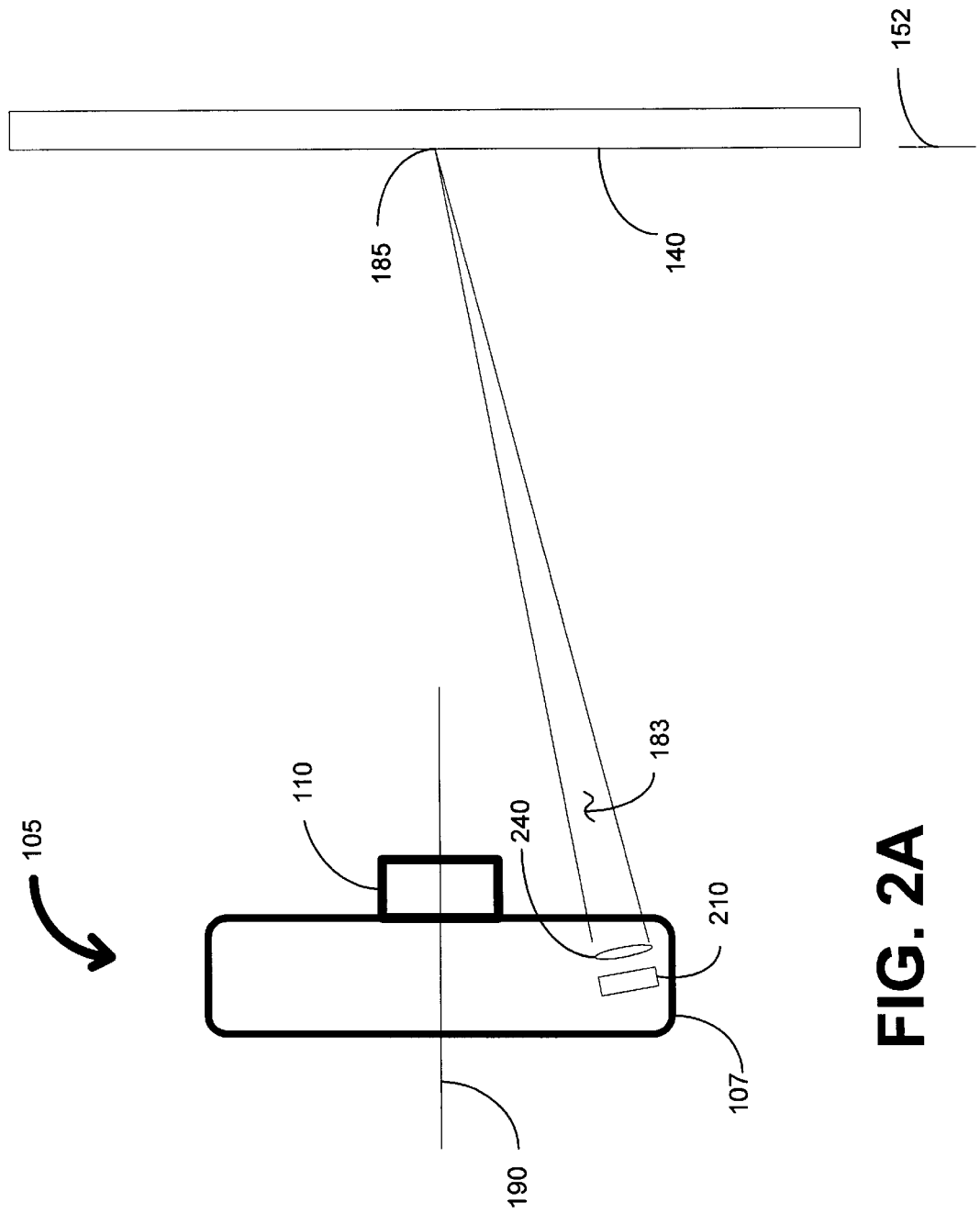
FIG. 2A is a drawing of a light beam apparatus in a representative embodiment in accordance with the invention.

FIG. 2A is a drawing of the first light beam apparatus 181 in a representative embodiment in accordance with the invention. Since in the representative embodiment, the first light beam apparatus 181 and the second light beam apparatus 182 are substantially identical, only one will be described herein. The light beam apparatus 181 comprises a light beam source 210, which could be for example a light emitting diode (LED) 210, a surface mount LED 210, or a laser diode 210 and a light beam lens 240. The light from the light beam source 210 is focused and directed by the light beam lens 240 in the general direction of the optical axis 190 of the image recording system 105. Ideally, the light beam lens 240 images the light from the light beam source 210 to a dot on the object 140 when the object 140 is in the second position 152, i.e., when the image 155 of the object 140 is in focus on the image recording medium 130.

Figure 2B:
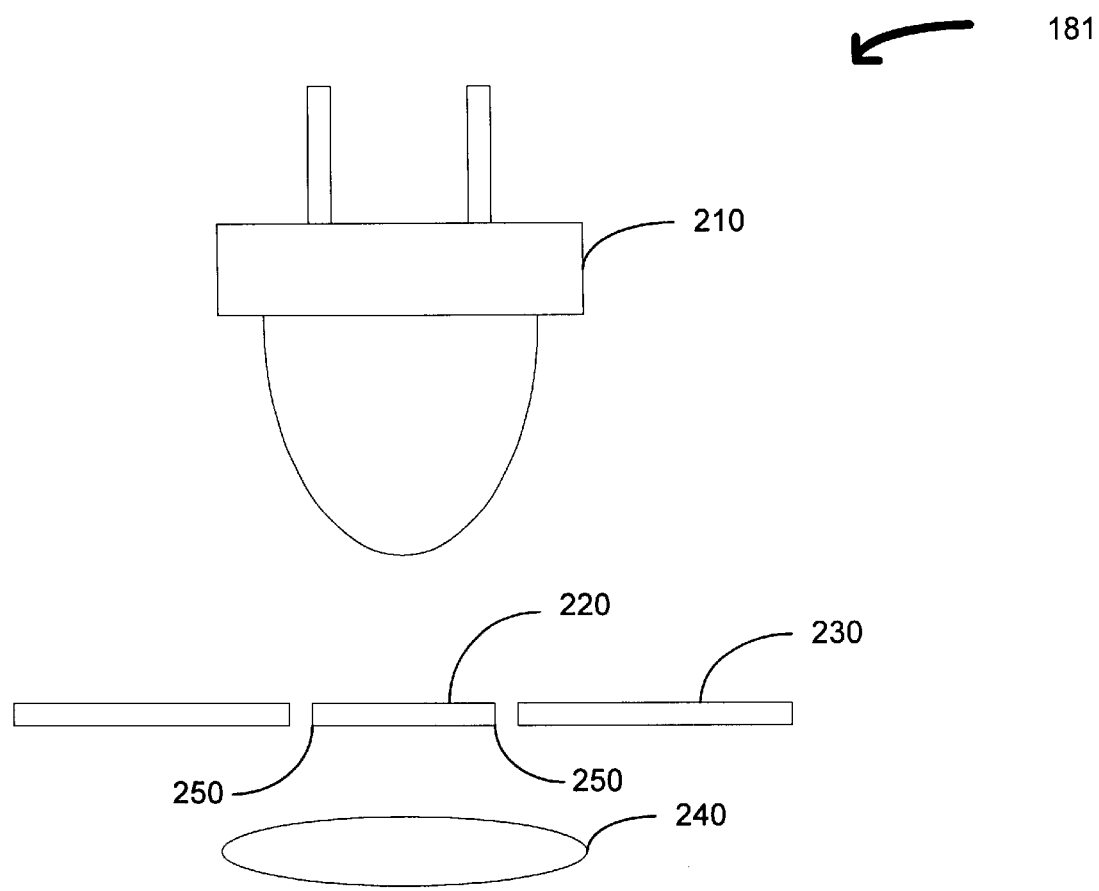
FIG. 2B is a drawing of another light beam apparatus in a representative embodiment in accordance with the invention.

FIG. 2B is a drawing of another first light beam apparatus 181 in a representative embodiment in accordance with the invention. Since in the representative embodiments, the first light beam apparatus 181 and the second light beam apparatus 182 are substantially identical, only one will be describe herein. In this representative embodiment, the light beam apparatus 181 comprises the light beam source 210, which could be for example the light emitting diode (LED) 210, the surface mount LED 210, or the laser diode 210, a diffuser 220, a light blocking plate 230, and the light beam lens 240. The diffuser 220 diffuses the light emitted by the light beam source 210 over the area defined by a perimeter 250 of the diffuser 220 with substantially all of the remaining light from the light beam source 210 being blocked by the light blocking plate 230. The light passing through the diffuser 220 is focused by the light beam lens 240 and directed in the general direction of the optical axis 190 of the image recording system 105. Ideally, the light beam lens 240 images the light passing through the diffuser 220 to a dot on the object 140 when the object 140 is in the second position 152, i.e., when the image 155 of the object 140 is in focus on the image recording medium 130.

Figure 3:
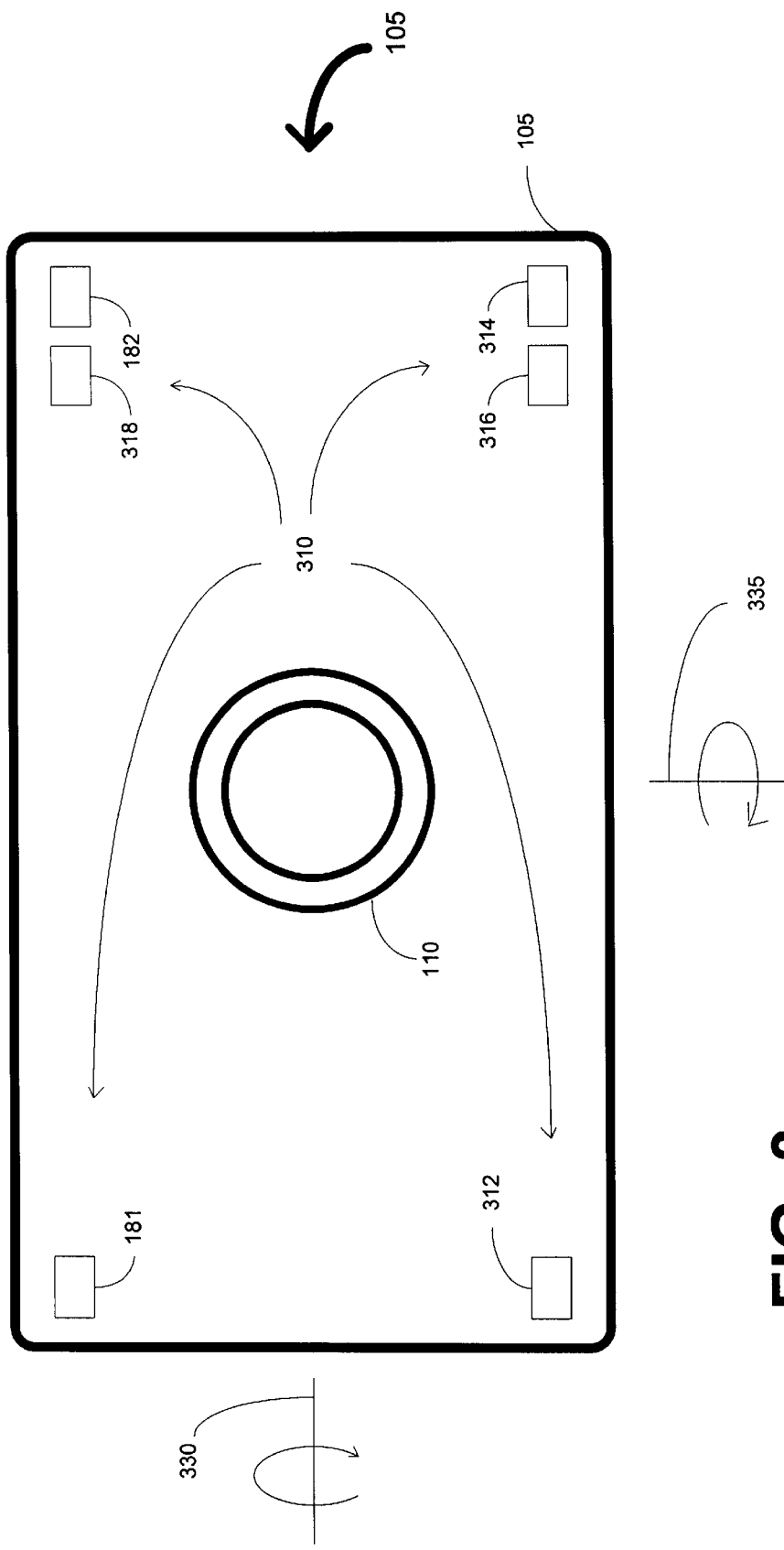
FIG. 3 is another drawing of an image recording system with a light beam focusing array in accordance with a representative embodiment of the invention.

FIG. 3 is another drawing of the image recording system 105 with a light beam focusing array 310 in accordance with a representative embodiment of the invention. In a second representative embodiment, the light beam focusing array 310 comprises the first light beam apparatus 181, the second light beam apparatus 182, a third light beam apparatus 312, and a fourth light beam apparatus 314. First and second light beams 183,184 from the first light beam apparatus 181 and the second light beam apparatus 182 may or may not be directed toward the optical axis 190 of the image recording system 105 and are incident upon a different area of the object 140 than are third and fourth light beams 322,324 from the third light beam apparatus 312 and the fourth light beam apparatus 314. For clarity of illustration, third and fourth light beams 322,324 are not shown in FIG. 3 but are substantially the same as the first light beam 183 shown in FIG. 2A. Thus, when first and second light beams 183,184 from the first light beam apparatus 181 and the second light beam apparatus 182 overlap, and when third and second light beams 322,324 from the third light beam apparatus 312 and the fourth light beam apparatus 314 overlap, any tilt of the object 140 with respect to the image recording system 105 along a first rotational axis 330 has been removed.

In a third representative embodiment, the light-beam focusing array 310 further comprises a fifth light beam apparatus 316 and a sixth light beam apparatus 318 in addition to the first light beam apparatus 181, the second light beam apparatus 182, the third light beam apparatus 312, and the fourth light beam apparatus 314. In the third representative embodiment, fifth and sixth light beams 326, 328 from the fifth light beam apparatus 316 and the sixth light beam apparatus 318 are not directed toward the optical axis 190 of the image recording system 105 and are incident upon a different area of the object 140 than are first, second, third, and fourth light beams 183,184,322,324 from the first light beam apparatus 181, the second light beam apparatus 182, the third light beam apparatus 312, and the fourth light beam apparatus 314. Thus, when first and second light beams 183,184 from the first light beam apparatus 181 and the second light beam apparatus 182 overlap, when third and fourth light beams 322,324 from the third light beam apparatus 312 and the fourth light beam apparatus 314 overlap, and when fifth and sixth light beams 326,328 from the fifth light beam apparatus 316 and the sixth light beam apparatus 318 overlap, any tilts along both the first rotational axis 330 and a second rotational axis 335 have been removed.

In representative embodiments, third, fourth, fifth, and sixth light beam apparatuses 312,314,316,318 are substantially as previously shown and described in FIGS. 2A and 2B for first light beam apparatus 181.

Exact placement of light beam apparatuses 181,182,312, 314,316,318 is typically not critical. However, the greater the separation between first and second light beam apparatuses 181,182 the more precisely the overlaying of the first and second light beams 183,184 can be determined and the more precisely the image 155 can be focused onto the image recording medium 130. In addition, the greater the separation between third and fourth light beam apparatuses 312, 314 the more precisely the overlaying of the third and fourth light beams 322,324 can be determined and again the more precisely the image 155 can be focused onto the image recording medium 130. And finally, the greater the separation between fifth and sixth light beam apparatuses 316,318 the more precisely the overlaying of the fifth and sixth light beams 326,328 can be determined and still again the more precisely the image 155 can be focused onto the image recording medium 130.

3. Concluding Remarks

A primary advantage of the embodiments as described in the present patent document over prior image recording systems 105 having fixed lens systems 110 is the ability to easily and inexpensively record a focused image. The operator can easily locate the object 140 in the fixed focal plane 170 by adjusting the distance between the object 140 and the lens 110 until the appropriate light beam images 185,186 incident on the object 140 from the appropriate light beam apparatus 181,182 overlap. Inexpensive, easy to use image recording systems 105 can be fabricated using the teachings of the present patent document. In addition, the effect of tilt of the image recording system 105 with respect to the object 140 can be minimized with additional third, fourth, fifth, and sixth light beam apparatuses 312,314,316,318 and additional overlaying of third and fourth light beams 322,324 and additional overlaying of fifth and sixth light beams 326,328 on the object when the object lies in the focal plane 170.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. An image recording system, comprising:
   an image recording medium;
   a lens having an optical axis and located at a first distance along the optical axis from the image recording medium, wherein the lens projects a substantially focused image of an object onto the image recording medium when the object is located at a second distance from the lens along the optical axis;
   a first light beam apparatus fixed in position relative to the lens, wherein the first light beam apparatus has capability of emitting a first light beam;
   a second light beam apparatus fixed in position relative to the lens, wherein the second light beam apparatus has capability of emitting a second light beam and wherein the first light beam and the second light beam intersect at a distance equal to the value of the second distance from a plane perpendicular to the optical axis and passing through the center of the lens;
   a third light beam apparatus fixed in position relative to the lens, wherein the third light beam apparatus has capability of emitting a third light beam; and
   a fourth light beam apparatus fixed in position relative to the lens, wherein the fourth light beam apparatus has capability of emitting a fourth light beam and wherein the third light beam and the fourth light beam intersect at a distance equal to the value of the second distance from a plane perpendicular to the optical axis and passing through the center of the lens.

2. The image recording system as recited in claim 1, wherein the first light beam and the second light beam further intersect on the optical axis.

3. The image recording system as recited in claim 1, wherein the image recording medium is selected from the group consisting of photographic film or an image sensor.

4. The image recording apparatus as recited in claim 1, wherein first and second light beam apparatus each comprise a light beam source and a light beam lens.

5. The image recording system as recited in claim 4, wherein the light beam source is selected from the group consisting of a light emitting diode (LED), a surface mount LED, or a laser diode.

6. The image recording system as recited in claim 1, wherein the image recording system is selected from the group consisting of a photographic film still camera, a photographic film motion picture camera, an analog video camera, a digital still camera, or a digital video camera.

7. The image recording system as recited in claim 1, wherein the image recording medium is selected from the group consisting of photographic film or an image sensor.

8. The image recording apparatus as recited in claim 1, wherein first and second light beam apparatus each comprise a light beam source and a light beam lens.

9. The image recording system as recited in claim 8, wherein the light beam source is selected from the group consisting of a light emitting diode (LED), a surface mount LED, or a laser diode.

10. The image recording system as recited in claim 1, wherein the image recording system is selected from the group consisting of a photographic film still camera, a photographic film motion picture camera, an analog video camera, a digital still camera, or a digital video camera.

11. The image recording system as recited in claim 1 further comprising:
   a fifth light beam apparatus fixed in position relative to the lens, wherein the fifth light beam apparatus has capability of emitting a fifth light beam; and
   a sixth light beam apparatus fixed in position relative to the lens, wherein the sixth light beam apparatus has capability of emitting a sixth light beam and wherein the fifth light beam and the sixth light beam intersect at a distance equal to the value of the second distance from a plane perpendicular to the optical axis and passing through the center of the lens.

12. The image recording system as recited in claim 11, wherein the image recording medium is selected from the group consisting of photographic film or an image sensor.

13. The image recording apparatus as recited in claim 11, wherein first and second light beam apparatus each comprise a light beam source and a light beam lens.

14. The image recording system as recited in claim 13, wherein the light beam source is selected from the group consisting of a light emitting diode (LED), a surface mount LED, or a laser diode.

15. The image recording system as recited in claim 11, wherein the image recording system is selected from the group consisting of a photographic film still camera, a photographic film motion picture camera, an analog video camera, a digital still camera, or a digital video camera.

16. An image recording system, comprising:
   a lens located a first distance from an image recording medium, wherein the lens projects a substantially focused image of an object onto the image recording medium when the object is located at a focal plane of the lens;
   a first light beam apparatus, fixed in position relative to the lens, to emit a first light beam;
   a second light beam apparatus, fixed in position relative to the lens, to emit a second light beam, wherein the first and second light beams intersect at said focal plane;
   a third light beam apparatus, fixed in position relative to the lens, to emit a third light beam; and
   a fourth light beam apparatus, fixed in position relative to the lens, to emit a fourth light beam, wherein the third and fourth light beams intersect at said focal plane.

17. The image recording system as recited in claim 16, wherein the first and second light beams intersect at a first point of said focal plane, and wherein the third and fourth light beams intersect at a second point of said focal plane.

18. The image recording system as recited in claim 16, wherein each of the light beam apparatuses comprise a light emitting diode to emit its light beam.

* * * * *